Aug. 12, 1947.   E. W. VOLK   2,425,583
WHEEL ROTATING MECHANISM
Filed June 15, 1945

INVENTOR.
EDWARD W. VOLK
BY George F. Goodgear
ATTORNEY

Patented Aug. 12, 1947

2,425,583

UNITED STATES PATENT OFFICE 2,425,583

WHEEL ROTATING MECHANISM

Edward W. Volk, St. Louis, Mo., assignor to Curtiss-Wright Corporation, a corporation of Delaware Application June 15, 1945, Serial No. 599,597

2 Claims. (Cl. 244—103)

The present invention relates to devices for effecting the prerotation of airplane landing wheels, and more particularly is directed to improvements in the mechanism utilized for effecting rotation of the wheels.

An object of the present invention resides in the provision of a very simple, light weight and powerful driving mechanism which may be applied to any landing gear installation with a minimum of assembly difficulties.

A further object of the invention resides in the utilization of a compact motor unit in combination with a quick release type of driving means which is positioned within the hub and axle portion of the landing wheel strut unit.

Figure 1:
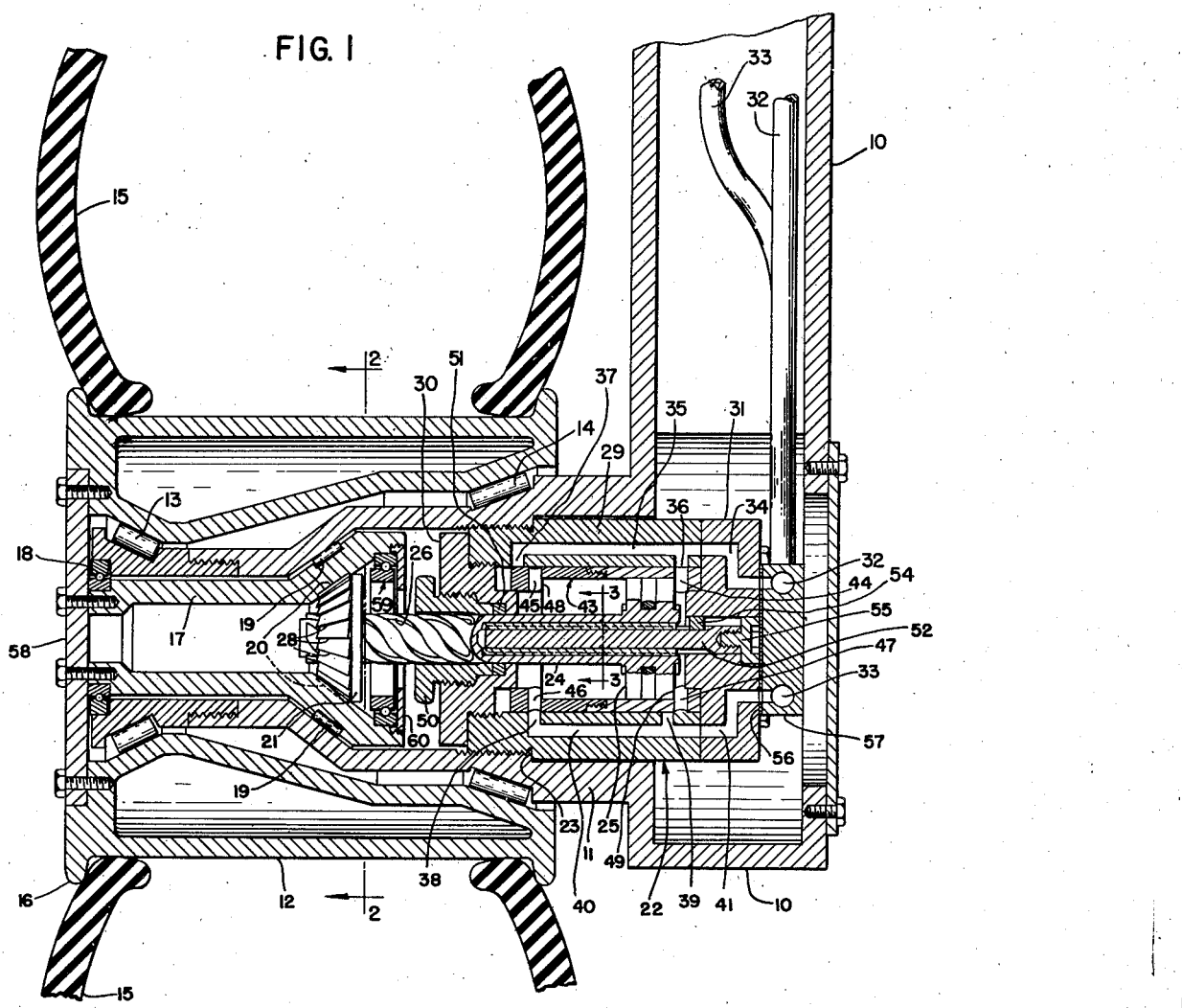
Figure 3:
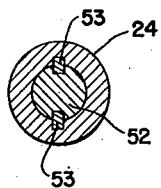
Figure 2:
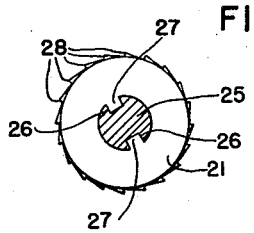

Other objects and advantages of the present invention will be pointed out as the description of a preferred embodiment thereof is given in connection with the accompanying drawings, in which:

Figure 1 is a sectional elevational view of the wheel driving mechanism as shown in assembly, Figure 2 is a sectional detail of a part only of the driving mechanism as seen at line 2—2 in Figure 1, and Figure 3 is an enlarged sectional detail of a part of the power unit, as seen at line 3—3 of Figure 1.

Referring now to the drawings and particularly to Figure 1 thereof, the lower end of the landing gear strut or shock member is illustrated at 10 as being provided with an axle member 11 which is of tubular construction. The axle member 11 and the strut member 10 may be of integral construction as is more generally the case in prevailing arrangements. A wheel unit 12 is mounted on the axle 11 and is free to rotate on roller bearing elements 13 at the outer end thereof and roller bearing elements 14 at the inner end thereof. A ground engaging tire 15 is mounted on the wheel hub 12 and is retained thereon in the usual manner by the provision of suitable flanges 16, as shown.

Mounted internally of the axle unit 11 there is shown a torque sleeve 17 which is adapted to rotate with respect to the axle on suitable anti-friction bearings 18 and 19. This torque sleeve is positioned in concentric relation with respect to the axle 11 and thrust produced during the spinning of the wheel is taken on the roller elements 19. The torque sleeve in the zone of the thrust bearing 19 is provided with an internal annular row of teeth indicated at 20, which teeth are adapted to be engaged by the teeth 28 formed on a uni-directional driving clutch element 21. In order to assure positive engagement of the driving clutch element the same is formed as a beveled element and the torque sleeve 17 in the zone of its complementary clutch teeth 20 is conically formed to receive the driving element 21, all as clearly indicated.

As indicated in the several views of the drawing, an hydraulic motor 22 is threadedly positioned within the bore of the axle 11 and is seated against an annular shoulder as at 23. The motor unit 22 is provided with an operating member or piston rod 24 which is attached to or integrally formed with a driving piston 25. The effective working portion of the piston rod 24 is formed to provide helical driving threads such as shown at 26. This drive is of the double helix type so that a pair of internally projecting lugs 27 formed on the driving element 21 (Figure 2) may be positioned therein to effect a symmetrical driving organization for the piston rod and clutch element.

In the present construction, the hydraulic motor comprises a cylindrical housing 29 provided at its inner end with a threaded closure cap 30 arranged to permit the passage of the piston rod 24. At the opposite end of the cylinder there is provided a ported cap or manifold member 31 which, upon assembly, will effect proper connection of the hydraulic supply and return lines 32 and 33 respectively. For example, the supply of pressure fluid is conducted into passage 34 in manifold 31 and flows into a conduit 35 formed in the cylinder housing. Passage 35, in turn, is connected with the working chamber of the cylinder by means of small lateral ports 36 and 37 opening at each end of the chamber. In like manner, the return fluid is conducted in proper sequence from the working chamber through lateral ports 38 or 39, longitudinal conduit 40 to a return passage 41 formed in the manifold 31 and finally to the return line 33. Control of the application of pressure fluid to either one side or the other of the piston element 25 is effected through the provision of a threadedly assembled two-part sleeve valve 43. This sleeve valve is provided with inlet ports 44 and 45 and outlet ports 46 and 47 at each end thereof in the manner shown, and such ports are adapted to register with the adjacent ports in the cylinder member 29 when the piston 26 is positioned at either one end or the other of the working chamber.

When pressure fluid is admitted to the line 32 and hence to conduit 34 and 35 fluid will immediately flow into the working cylinder through ports 36 and 44 and move piston element 25 to the left so as to drive piston rod 24 outwardly. In so doing the piston will move relative to the sleeve valve element 43 through the greater portion of its stroke. As the piston approaches the opposite end of the working chamber an annular shoulder 48 formed internally of the sleeve valve is adapted to be contacted by the piston, at which time the piston and sleeve valve will be moved toward the left as a unit. This has the effect of cutting off the inlet port 36 and opening the opposite inlet port 37 to registry with port 45 in the valve, so that pressure fluid will now be introduced to the working chamber for cycling or reversing the movement of the piston and rod. Concurrently, with the alternate cutting off of the inlet ports 36 and 37 respectively, the outlet ports 38 and 39 are controlled in the same manner but in an opposite cycle. At the time that port 36 is open to the working chamber, outlet port 38 is shown as being in a position to permit the out flow of hydraulic fluid from the working chamber to and through the return line 33 by way of sleeve valve port 46. When the piston is at the left hand end of its stroke, its abutment with the internal annular shoulder 48 on the sleeve valve will effect a closure of the outlet port 38 and opening registry of valve port 47 with its associated outlet port 39 so that a reverse cycle may take place. A second annular shoulder 49 similar in all respects to the shoulder 48 is also formed on the opposite end of the interior of sleeve valve 43 so that port control may be effected by piston movement in the opposite direction to that already described.

In constructing the present hydraulic power unit or motor the end cap 30 is suitably apertured to receive the piston rod 24 and a fluid packing gland 50 is threaded into the cap aperture to establish a fluid seal around the piston rod at the packing 51. The piston rod is drilled out to form a bore for receiving a non-rotative guide rod 52 (Figures 1 and 3) in which opposed key elements 53 prevent any relative rotary displacement of piston rod 24 thereon. The guide means 52 is non-rotatively seated in the manifold member by a suitable keying element 54 and the entire assembly is secured by the holding screw 55 and fluid sealed by the gasket 56 positioned under fluid line connector block 57. Though not shown, the sleeve valve may be secured against rotation by means of one or more dowel pins carried by the manifold 31 and these dowels may also act to position the manifold in proper fluid conduit connection with the cylinder conduits.

It will now be evident that as hydraulic motor 22 automatically operates in its driving and return cycle, the threaded but non-rotating piston rod will exert a rotational force on the driving element 21 which, in turn, will intermittently rotate the torque sleeve 17. A suitable connection between the wheel structure 12 and sleeve 17 has been provided in the form of an end plate 58 which is rigidly secured to the torque sleeve and to the wheel hub, as indicated. Therefore, as piston rod 24 moves outwardly the wheel and hub will be given a rotational impulse. Upon retraction of the piston rod the teeth 28 of element 21 will be disengaged from the teeth 20 on torque sleeve 17 so that no retardation of the rotating wheel will occur. Continued operation of the motor unit will provide a rotating impulse on each outward stroke of the piston rod. In order to limit the axial disengaging movement of the driving clutch 21, a bearing 59 and bearing retainer plate 60 has been assembled upon the inner enlarged end of the torque sleeve as shown.

Control of the speed and rotation of the landing wheel 15 may be performed in several well known manners. In the present arrangement the R. P. M. of the wheel may be governed by the number of strokes or cycles of operation of the motor unit. Hence, the operator or pilot of the airplane may calculate the approximate speed of the landing wheels 15 by the length of time he allows the hydraulic motor unit to operate. Of course, the incorporation of a tachometer or other indicating element can be made so that a more accurate reading may be obtained as to landing wheel R. P. M. It should be noted that the presently described wheel rotating mechanism may be adopted for use in all sizes and types of aircraft and that it may be necessary, if the size of the airplane warrants, to incorporate accurate recording devices for measuring landing wheel R. P. M. In the application of this present mechanism to small airplanes, it is considered necessary only to approximate or to bring the landing wheel rotation within a reasonable approximation of the landing speed of the airplane.

The foregoing description is intended to cover only one preferred embodiment of the present invention and should be considered in an instructive rather than in a limiting sense. It will also be understood that certain modifications, alterations, and changes may be made herein without departing from the scope of the invention as defined by the claims hereinafter appended.

What is claimed is:

1. In a drive mechanism for rotating an aircraft wheel, a tubular support upon which the wheel is rotatably mounted, a first clutch element journalled within the tubular support and provided with bearing means holding it against axial displacement therein, the outer end of said clutch element being connected to the wheel, a second clutch element engageable with the first clutch element within the tubular support, a helically threaded member within the tubular support and coaxial with the wheel, and a piston connected to said member for reciprocating said member, the latter being threaded to the second clutch element for moving the same axially into clutch engagement with the first clutch element and thereafter rotating the first clutch element by and upon axial movement of the piston and member in one direction, and for moving the second clutch element axially from such clutch engagement by and upon axial movement of the piston and member in the opposite direction.

2. In a drive mechanism for rotating an aircraft wheel, a tubular support upon which the wheel is rotatably mounted, a first clutch element journalled within the tubular support and provided with thrust bearing means for holding it against axial displacement therein, the outer end of said clutch element being connected to the wheel and the inner end thereof being provided with a conical toothed surface, a second clutch element within the tubular support and having a complementary conical toothed surface for clutch engagement with said surface of the first clutch element, a helically threaded member within the tubular support and coaxial with the wheel, and a piston connected to the member for reciprocating said member, the latter being threaded to the second clutch element for moving the same axially into clutch engagement with the first clutch element and thereafter rotating the first clutch element by and upon axial movement of the piston and member in one direction, and for moving the second clutch element axially from such clutch engagement by and upon axial movement of the piston and member in the opposite direction.

EDWARD W. VOLK.

REFERENCES CITED

The following references are of record in the file of this patent:

UNITED STATES PATENTS

| Number | Name | Date |
|---|---|---|
| 219,739 | Kirsten | Sept. 16, 1879 |
| 771,864 | Eager | Oct. 11, 1904 |
| 2,135,699 | Campbell | Nov. 8, 1938 |
| 2,298,523 | Webster | Oct. 13, 1942 |

FOREIGN PATENTS

| Number | Country | Date |
|---|---|---|
| 520,994 | Great Britain | May 13, 1942 |